3,817,907
THERMOPLASTIC MOLDING COMPOSITIONS AND MOLDED ARTICLES
Peter Rolf Müller, Coraopolis, Pa., and Günter Peilstöcker, Krefeld-Bockum, Germany, assignors to Bayer Aktiengesellschaft, Leverkusen, Germany
No Drawing. Filed Mar. 16, 1972, Ser. No. 235,321
Claims priority, application Germany, Mar. 31, 1971, P 21 15 552.2; Nov. 16, 1971, P 21 56 719.1
Int. Cl. C08g *51/04, 51/10*
U.S. Cl. 260—37 PC                              9 Claims

ABSTRACT OF THE DISCLOSURE

Thermoplastic molding compositions and molded articles which have a high stiffness are provided wherein the thermoplastic is a polycarbonate containing asbestos flour. Thermoplastic molding compositions and molded articles having high stiffness and fire resistance are provided when the asbestos flour containing polycarbonate also contains from about 3% to about 7% by weight based on the total weight of the absestos flour containing polycarbonate of glass fibers.

---

The invention relates to thermoplastic molding compounds, especially those consisting of polycarbonates of aromatic bis-hydroxy compounds for the production of molded articles of high stiffness. Thermoplastic molding compounds for the production of molded articles of high stiffness are of interest for a variety of technical applications.

Heretofore it had been known to increase the stiffness of thermoplasts and duromers by the addition thereto of fibrous materials, e.g. of glass fibers having a length of 50–500µ, preferably 100–350µ, of asbestos fibers of carbon fibers to such an extent that the thus reinforced material could in many cases replace molding materials as well as light metals and non-ferrous metals as construction materials. It is further known that, depending on the length of the fibers used and on the viscosity of the melt of the synthetic material concerned, the surface of a part injection-molded from a fiber filled molding composition has a more or less pronounced texture caused, for example, by orientation of the fibers in the direction of flow. As a consequence, the surfaces of parts injection-molded from fiber-inforced synthetic materials do not meet practical requirements in all cases. Moreover, it has been found that finish parts injection-molded from the aforesaid thermoplastic molding compound have an increased tendency to distortion.

These disadvantages can be obviated by using powdered fillers rather than fibrous fillers in molding compounds. However, the use of powdered additives in thermoplastic molding compounds, especially polycarbonates of aromatic dihydroxy compounds, has hitherto not given rise to improved stiffness in the molded parts produced therefrom such as has hitherto been achieved by the addition of fibrous material such as, for example, glass fibers. Where, as is often the case, improved stiffness is required, such powder filled molding compositions are not practical (see Table). It is therefore an object of this invention to provide improved molding compositions that are devoid of the foregoing disadvantages. These objects are accomplished in accordance with this invention, generally speaking, by providing molding compositions which contain asbestos flour. Surprisingly, it has now been found that the addition of asbestos flour such as, for example, the "Burgenlandische" white asbestos flour, to molding compounds, especially to thermoplastic molding compounds such as polycarbonates, improves the stiffness of molded articles produced therefrom to the same extent as hitherto achieved by the addition of glass fibers but without the attendant disadvantages of fibrous additives. Due to the powdery consistency of the asbestos flours, there is no pronounced surface texture or tendency to distortion in the molded product.

As an extension of this concept it has also been found that by the addition of from about 3% to about 7% by weight, preferably 5% by weight, of gass fibers, referred to the total weight of the thermoplastic molding composition, i.e., the asbestos flour-containing molding compounds of this invention, the high stiffness of molded articles can be increased even further. Most importantly, however, the flame resistance of class "SE 1" (measured according to Underwriters' Laboratories Subj. 94) demanded in many cases for commercial applications is achieved without the pronounced disadvantages mentioned above that usually inhere in the use of fibrous materials in thermoplastic molding compounds, especially in polycarbonates of aromatic bis-hydroxy compounds.

The term "asbestos flours" as used herein refers to powdery magnesium silicates such as are known, for example, as "Burgenlandisches Weissasbestmehl." (Composition: 56.5% $SiO_2$, 28% MgO, 5% $Al_2O_3$.)

The quantity of the asbestos flour to be added to the thermoplastic molding compound is determined by the demands to be made on the finished article such as, for example, stiffness and impact strength. In practice, the molding compounds may contain from about 20% to about 50% by weight of asbestos flour, preferably 30% to 40% by weight based on the weight of the thermoplastic molding composition. The prescribed amounts of asbestos flour can be added before or during the preparation of the polycarbonate. Neither the sole addition of less than 10% by weight of glass fibers to polycarbonate molding compounds nor the sole addition of asbestos flours in the usual quantities of 20% by weight to 50% by weight to polycarbonate molding compounds yield polycarbonate molding compounds which satisfy the demands of fire class "SE 1" (tested according to Underwriters' Laboratories Sub. 94). The combined effect of asbestos flour and small amounts of glass fibers was therefore surprising and unforeseeable.

Molded articles of high stiffness can be obtained from the molding compounds according to the invention. The addition of the asbestos flours of this invention makes it possible to produce molded articles, the elasticity moduli of which fall between 30,000 kp./sq. cm. and 150,000 kp./sq. cm., especially between 50,000 kp./sq. cm. and 80,000 kp./sq. cm.

The electrical and thermal properties of asbestos-filled polycarbonates are not adversely affected.

The incorporation of the asbestos flour into thermoplastic molding compounds such as polycarbonate can be carried out, for example, by intimately mixing the thermoplastic molding compound with the asbestos flour in the desired proportion with the aid of conventional mixing units such as, for example, the "Plasmix Mixer," and extruding the mixture at between 250° C. and 350° C. via an extruder to form a strand which is then granulated. The dosed feeding of the thermoplastic molding compounds and the asbestos flour into the extruder may also be carried out separately without previous mixing with the aid of two dosing scales. It is also possible to stir the asbestos flour into the solution of the thermoplastic molding compound and to extrude the material remaining after evaporation of the solvent in the usual way.

The glass fibers may be admixed as such or in the form of a polycarbonate granulate filled with glass fibers. In any case, the glass fibers may be introduced into the thermoplastic molding compound before or after, but preferably during the addition of the asbestos flour. They may also be added to the reaction mixture before, during or after the preparation of the polycarbonate. Incorporation into polycarbonate solutions or melts is also possible. The glass may also be mixed with a polycarbonate granulate and this mixture homogenized by subsequent melt extrusion.

All commercial types of glass fibers are suitable as the glass fibers of this invention including milled fibers, rovings and chopped strands.

In the same process of production the usual additives may also be added to the polycarbonate, for example, pigments suitable for coloring the polymer.

The combination of additives according to the invention makes it possible to produce molded articles the elasticity moduli of which fall between 30,000 kp./sq. cm. and 150,000 kp./sq. cm., especially between 70,000 kp./sq. cm. and 100,000 kp./sq. cm., measured on standard test specimens.

Suitable thermoplastic molding compounds in the meaning of the invention are primarily polycarbonates of aromatic bis-hydroxycompounds: they are prepared, for example, as described in U.S. Pats. 3,028,365; 2,999,835; 3,187,065; 3,094,508; 3,227,740 and the like and can be made from bivalent phenols such as resorcinol, hydroquinone, dihydroxydiphenylene, especially from bis-(hydroxyphenyl)-alkanes, halogenated bis-(hydroxyphenyl)-alkanes, such as e.g. 4,4'-dihydroxy-3,5,3',5'-tetrachloro-diphenyl-propane or 4,4'-dihydroxy-3,5,3',5'-tetrabromo-diphenyl-propane, bis(hydroxyphenyl)-cycloalkanes, -sulphones -sulphoxides, -ethers and/or-sulphides, optionally in mixture with glycols, with derivatives of carbonic acid, for example its diesters or dihalides, possibly with the addition of subsidiary amounts of dicarboxylic acids or of their derivatives suitable for ester formation; and they have an average molecular weight of about 10,000 to 200,000, preferably between about 25,000 and 100,000, as determined via relative viscosity measured in a 0.5% solution in methylene chloride at 25° C.

Molded articles of thermoplastic molding compounds, especially of polycarbonates, which contain the additives according to the invention are suitable for the production of structural elements which are subjected to low impact and tensile stresses and of which high stiffness, an optimal surface, low tendency to distortion, good electrical values and, in particular, high fire resistance are demanded. Housings for tools and electrical equipment, glazings, sheeting and the like are only a few such applications.

The invention is further illustrated but is not intended to be limited by the following examples in which all parts and percentages are by weight unless otherwise specified. In the following Examples, the modulus of elasticity is measured according to DIN 53,455 and the burning properties are measured via Underwriters' Laborotories, Subj. 94, on ASTM test specimens of the dimensions 1/16 x 1/2 x 5 inches and 1/4 x 1/2 x 5 inches as follows:

The individual test specimens are vertically clamped and exposed twice for 10 seconds each time to a gas flame of 20 mm. height, the gas flame having a distance of 10 mm. from the lower edge of the test piece. The after-burning times are measured. For classifying the material in a fire class, 5 test pieces of each dimension are tested in the injection-fresh and in the tempered state (tempering is carried out at 70° C. for 7 days).

The following criteria are decisive for classification:

Fire class *"not self-extinguishing"*:
  After-burning times: >30 sec.
  Average after-burning time: >25 sec.
Fire class *"SE 2"*:
  Average after-burning time: ≦25 sec.
  Maximal acceptable after-burning time: 30 sec.
  The material may drip off burning.
Fire class *"SE 1"*:
  The after-burning times correspond to those of class "SE 2," but the material must not drip off burning.

Fire class *"SE 0"*:
  Average after-burning time: ≦5 sec.
  Maximal acceptable after-burning time: 10 sec.
  The material must not drip off burning.

Elasticity moduli of filled polycarbonates derived from bisphenol A and prepared as described in Example 1 as a function of the type of filler, measured by the tensile strength test according to DIN 53,455 on standard test specimens (Shoulder rods No. 2).

| Designation of filler | Chemical composition as percent | Percent b. w. of filler in polycarbonate | Elasticity modulus of filled polycarbonate (kp./sq. cm.) |
|---|---|---|---|
| | | | ¹20,000 |
| Aluminium silicate acc. to "Neuburger Kieselkreide" | 83% SiO₂ | 30 | 35,000 |
| Quartz flour acc. to "Quarzmehl N 500". | SiO₂ | 30 | 33,000 |
| Aluminium magnesium silicate acc. to "Plastorit Naintsch". | 51% SiO₂, 12.5% MgO, 23% Al₂O₃, 3.6% FeO, 2.8% K₂O. | 30 | 30,000 |
| | | 30 | 30,000 |
| Aluminium silicate acc. to "Satintone No. 1". | 45.4% SiO₂, 38.8% Al₂O₃. | 30 | 40,000 |
| Calcium carbonate acc. to "Omya BLR/3". | 99.75% CaCO₃ | 30 | 30,000 |
| Barium sulphate acc. to "Blanc fixe". | 98.5%-99% synth. BaSO. | 50 | 40,000 |
| Barium sulphate acc. to "EWO-Albaryt Super 476". | Appr. 98% BaSO₄. | 30 | 25,000 |
| Asbestos flour acc. t "Asbestmehl J.K." | 50.63% SiO₂, 10.47% Al₂O₃, 3.8% Fe₂O₃, 29.3% MgO, | 30 | 50,000 |
| Asbestos flour acc. to "Burgenlandische Weissasbestmehl". | 56.5% SiO₂, 28% MgO, 5% Al₂O₃. | 30 | 60,000 |
| Do | 56.5% SiO₂, 28% MgO, 5% Al₂O₃. | 35 | 70,000 |
| Glass fibers acc. to milled fibers "ES-10 W". | E-glass | 30 | 60,000 |

¹ Non-filled polycarbonate.

The modulus of elasticity serves as a measure of the stiffness of the test sample when determined by the DIN 53,455 tensile strength test. As can be readily appreciated by a review of the tabulated results, polycarbonates containing powders other than asbestos flour have much lower modulus of elasticity properties than the same polycarbonate containing asbestos flours. Further, the modulus of elasticity or stiffness of the polycarbonates containing asbestos flour is at least equal to the stiffness of polycarbonates containing fibrous reinforcement.

Example 1

70 Parts by weight of a polycarbonate granulate obtained from bisphenol A and phosgene and having a relative viscosity of 1.32, measured in a 0.5% solution in methylene chloride at 25° C., and 30 parts by weight of "Burgenlandisches Weissasbestmehl' are fed continuously and separately via two dosing scales into the feeding funnel of a double shaft extruder. The thermoplastic material is homogenized in the extruder, extruded at 280° C. to give a strand and subsequently granulated.

The elasticity modulus determined by the tensile strength test according to DIN 53,455 for shoulder rods (No. 2) (standard test specimens) injection-molded from this granulate at 300° C. is 60,000 kg./sq. cm.

Example 2

60 Parts by weight of a polycarbonate granulate obtained from bisphenol A and phosgene and having a relative viscosity of 1.32, measured in a 0.5% solution in methylene chloride at 25° C., 35 parts by weight of "Burgenlandisches Weissasbestmehl" and 5 parts by weight of glass fibers "OC/F 409" are fed continuously and separately via 3 dosing scales into the feeding funnel of a double shaft extruder. The thermoplastic material is homogenized in the extruder, extruded at 280° C. to give a strand, and subsequently granulated.

The elasticity modulus determined by the tensile strength test according to DIN 53,455 for shoulder rods (No. 2) (standard test specimens) injection-molded from this granulate at 300° C. is 90,000 kp./sq. cm.

According to the fire test of Underwriters' Laboratories, Subj. 94, the material satisfies the demands of class "SE 1."

COMPARATIVE EXAMPLES

Example 3

A granulate produced as described in Example 2 but without glass fibers is tested accordingly: the elasticity modulus determined by the tensile strength test according to DIN 53,455 for shoulder rods (No. 2) (standard test specimens) injection-molded from this granulate at 300° C. is 70,000 kp./sq. cm.

According to the fire test of Underwriters' Laboratories, Subj. 94, the material is "not self-extinguishing."

Example 4

A granulate produced as described in Example 2 but without asbestos flour is tested accordingly: the elasticity modulus determined according to the tensile strength test DIN 53,455 for shoulder rods (No. 2) (standard test specimens) injection molded from this granulate at 300° C. is 30,000 kg./sq. cm.

According to the fire test of Underwriters' Laboratories, Subj. 94, the material is "not self-extinguishing."

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Thermoplastic polycarbonate molding compounds which contain from 20 to 50 percent by weight based on the total weight of the polycarbonate compounds of asbestos flour.

2. The molding compound of Claim 1 wherein the polycarbonate has a molecular weight of between 10,000 and 200,000.

3. The molding compound of Claim 1 wherein the polycarbonate is a polycarbonate of an aromatic bishydroxy compound.

4. Molded articles of the molding compound of Claim 1 which molded articles have a modulus of elasticity of between 30,000 kp./cm.$^2$ and 150,000 kp./cm.$^2$.

5. The molding compound of Claim 1 which contains, in addition, from 3% to 7% by weight based on the total weight of the polycarbonate molding compound of glass fibers.

6. Molded articles of the molding compound of Claim 5 which molded articles have a modulus of elasticity of between 30,000 kg./cm.$^2$ and 150,000 kp./cm.$^2$ and a fire resistant classification of SE 1.

7. The molding compound of Claim 1 which contains from 30 to 40% by weight based on the total weight of the polycarbonate molding compound of asbestos flour.

8. The molding compound of Claim 7 which contains, in addition, from 3% to 7% by weight based on the total weight of the polycarbonate molding compound of glass fibers.

9. The molding compound of Claim 1 wherein the polycarbonate has a molecular weight of between 25,000 and 100,000.

References Cited

UNITED STATES PATENTS

| | | | |
|---|---|---|---|
| 2,999,835 | 9/1961 | Goldberg | 260—824 R X |
| 3,597,394 | 8/1971 | Rawlings | 260—37 PC UX |
| 3,488,317 | 1/1970 | Hechelhammer et al. | 260—37 PC |

OTHER REFERENCES

Simonds et al.: Handbook of Plastics, D. Van Nostrand Co., Inc., 1949, pp. 308–309.

LEWIS T. JACOBS, Primary Examiner